United States Patent [19]

Davey

[11] Patent Number: 5,630,682
[45] Date of Patent: May 20, 1997

[54] DRILL BIT ASSEMBLY

[75] Inventor: Leslie T. Davey, Windsor, Canada

[73] Assignee: Tooling Technology Centre Inc., Windsor, Canada

[21] Appl. No.: 514,371

[22] Filed: Aug. 11, 1995

[51] Int. Cl.$^6$ ........................................... B23B 47/34
[52] U.S. Cl. .................... 408/67; 408/97; 409/137
[58] Field of Search ........................ 408/56, 67, 72 R, 408/72 B, 97; 409/137

[56] References Cited

U.S. PATENT DOCUMENTS

| 2,420,905 | 5/1947 | Olsen | 408/56 |
| 3,690,780 | 9/1972 | Bjelland et al. | 408/58 |
| 4,037,982 | 7/1977 | Clement | 408/61 |
| 4,097,176 | 6/1978 | Wanner et al. | 408/56 |
| 4,915,550 | 4/1990 | Arai et al. | 408/56 |
| 5,033,917 | 7/1991 | McGlasson et al. | 408/72 B |
| 5,332,341 | 7/1994 | Arai et al. | 408/61 |
| 5,356,245 | 10/1994 | Hosoi et al. | 408/67 |

FOREIGN PATENT DOCUMENTS

| 1048307 | 2/1979 | Canada . | |
| 16910 | 1/1988 | Japan | 408/56 |
| 179108 | 6/1994 | Japan | 408/56 |
| 52294 | 12/1966 | Poland . | |

Primary Examiner—Daniel W. Howell
Attorney, Agent, or Firm—Jeffrey T. Imai; Arne I. Fors; D. Doak Horne

[57] ABSTRACT

A drill bit assembly has a housing having a central passageway including a pressure chamber and a vacuum chamber. The pressure chamber is connectable with a pressure source and the vacuum chamber is connectable with a vacuum source. The pressure chamber and vacuum chamber are in fluid communication with each other. A bearing assembly has an outer race rigidly mounted within the pressure chamber and an inner race for frictionally engaging the drill bit. A bracket mounts the housing with the drill bit extending through the central passageway. A seal is formed between the pressure chamber and the vacuum chamber as fluid, such as air, from the pressure source flows into the pressure chamber to the vacuum chamber for exhausting to the vacuum source.

14 Claims, 1 Drawing Sheet

DRILL BIT ASSEMBLY

FIELD OF THE INVENTION

This invention relates to a drill bit assembly. In particular, this invention relates to a drill bit assembly for guiding a drill bit during operation for improving accuracy and minimizing breakage of the drill bit.

BACKGROUND OF INVENTION

Drills are used in all facets of manufacturing. All drills suffer from a basic problem that the base of the drill bit is retained in a chuck while the tip is free to cantilever. The tip of the drill bit not only "wobbles"on the drilling surface as the drill is initially advanced, reducing the accuracy of the position of the hole being drilled, but also "wobbles"as the drill bit is advanced forming an oversized hole.

Pilot holes may be punched or drilled with a short small diameter drill bit. The use of prior holes improves the accuracy of the drilled hole. However, this requires an additional manufacturing step, which adds manufacturing costs and production time.

Drill assemblies are currently commercially available from The Budd Company. These drill assemblies have a bushing, which guides the drill bit to minimize "wobbling". However, the bushing still allows for 8/1000 of an inch (0.008") variance on all sides resulting in oversized holes. Further, this bushing wears down quickly requiring frequent replacement. Still further, the prior art drill assemblies are relatively noisy dung operation, increasing concerns of health and safety of workers in close proximity of the drill.

An additional problem with the prior art drill assemblies is that the shavings or dust which is generated by the drill bit has a tendency to foul up the bushing, causing the assembly to seize up within a couple of hours. Vacuum hoses are commonly used to extract shavings and dust. Even with a vacuum system, these drill bit assemblies must still be replaced every 2,000–5,000 hours.

SUMMARY OF THE INVENTION

The disadvantages of the prior art may be overcome by providing drill bit assembly having a self-guiding drill bushing encased in bearings with a positive air flow for forming an air seal about the bearing, and a vacuum for extracting shavings and dust.

According to one aspect of the invention, there is provided a drill bit assembly for guiding a drill bit of a drill. The assembly has a housing having a central passageway including a pressure chamber and a vacuum chamber. The pressure chamber is connectable with a pressure source and the vacuum chamber is connectable with a vacuum source. The pressure chamber and vacuum chamber are in fluid communication with each other. A bearing assembly has an outer race rigidly mounted within the pressure chamber and an inner race for frictionally engaging the drill bit. A bracket mounts the housing with the drill bit extending through the central passageway. A seal is formed between the pressure chamber and the vacuum chamber as fluid, such as air, from the pressure source flows into the pressure chamber to the vacuum chamber for exhausting to the vacuum source.

According to another aspect of the invention, there is provided a drill bit assembly having a vacuum chamber which is an insert which fits within a pressure chamber for clamping a bearing within the pressure chamber.

According to another aspect of the invention, there is provided a self-guiding drill bit assembly comprising a housing having a central passageway comprising a pressure chamber in fluid communication with a vacuum chamber. The pressure chamber is connectable with a pressure source and the vacuum chamber is connectable with a vacuum source. The pressure source effects a fluid flow from the pressure chamber to the vacuum chamber substantially preventing debris deposited into the vacuum chamber from entering the pressure chamber. A bushing is journal mounted within the pressure chamber. The housing is mountable to receive the drill bit through the central passageway in frictionally engagement with the bushing for maintaining axial alignment of the drill bit.

DESCRIPTION OF DRAWINGS

In figures which illustrate the preferred embodiment of the invention.

DETAILED DESCRIPTION OF THE INVENTION

Figure 1:
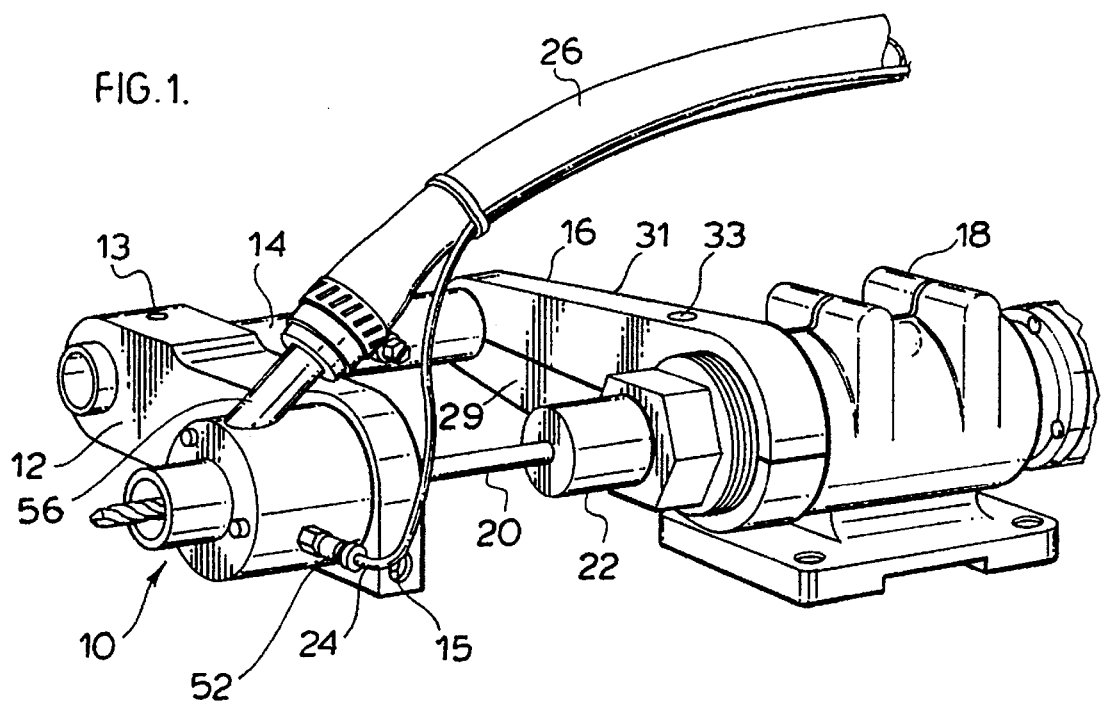
FIG. 1 is a perspective view of the drill bit assembly of the present invention mounted on a conventional drill.

The present invention is generally illustrated in FIG. 1. The drill bit assembly 10 is mounted on a guide bracket 12. Guide bracket 12 is releasably and slidably mounted on guide rod 14, which extends from base bracket 16. Base bracket 16 is mounted onto drill 18. Drill bit 20 is mounted in drill chuck 22 of drill 18 for extending through drill bit assembly 10. Drill bit assembly 10 has a pressure hose 24 and a vacuum hose 26.

Guide rod 14 is mounted on base bracket 16 to extend substantially parallel to the drill bit 20. Guide bracket 12 has a length approximately equal to the length of base bracket 16. Guide bracket 12 has a bore at one end for slidably mounting onto guide rod 14 and a bore at the opposite end for receiving the drill bit assembly 10. A small threaded bore and cap screw 13 can be engaged to lock guide bracket 12 in place along the length of guide rod 14. Guide bracket 12 has a threaded bore and cap screw 15 for releasably retaining drill bit assembly 10 on guide bracket 12.

Guide bracket 12 and base bracket 16 are similarly shaped. However, base bracket 16 is comprised of two half units 29 and 31 which complementarily fit together about an end region of drill 18. A threaded bore and hex nut 33 join the two halves 29 and 31 together to clamp about the drill 18 and clamp guide rod 14, forming a substantially integral unit.

Preferably, guide bracket 12, guide rod 14 and base bracket 16 are made from a machine steel.

Figure 2:
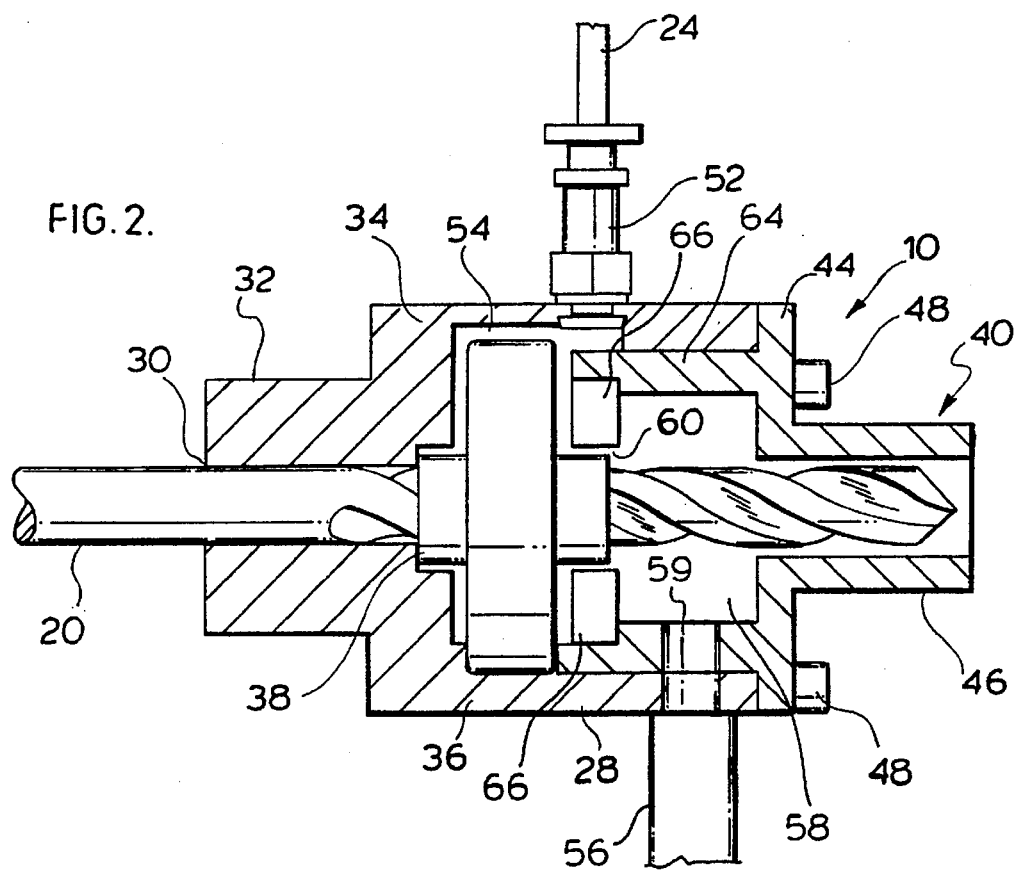
FIG. 2 is a sectional view of the drill bit assembly of FIG. 1.

Referring now to FIG. 2, the drill bit assembly 10 is described in greater detail. Drill bit assembly 10 has an outer housing 28, which has a longitudinal bore 30 through a base 32. The outside diameter of base 32 is sized to engage a complementary bore in guide bracket 12 for mounting thereon.

Outer housing 28 has a tubular portion 34 integral with the base 32. Tubular portion 34 has an open end and base 32 partially closes the other end. Generally the tubular portion 34 has a greater outside and inside diameter than base 32 and bore 30, respectively. Within tubular portion 34 is a pressure chamber 54, in which bearing 36 is mounted. Bearing 36 is a standard ball bearing assembly having an inner race and an outer race separated by a series of balls.

Bushing 38 frictionally engages the inner race of bearing 36. Bushing 38 has an inside diameter which is approximately equal to the diameter of the drill bit. Bushing 38 is preferably made of a hard material such as drill bushing 62 Rockwell.

Insert 40 fits within pressure chamber 54. Insert 40 has tubular walls 64 and end wall 66 defining vacuum chamber 58. Tubular wall 64 has an outside diameter which frictionally engages the inside diameter of tubular portion 34. Flange 44 extends radially outward from an end of tubular wall 64 to abut with the end perimeter surface of tubular portion 34. Circumferentially spaced about the end perimeter surface is a series of threaded bores which receive bolts 48 for securing insert 40 onto tubular portion 34. Tubular section 46 extends from flange 44.

End wall 66 of vacuum chamber 58 has a circular opening 50 for receiving bushing 38. The diameter of opening 50 is greater than the outside diameter of bushing 38, allowing fluid communication between pressure chamber 54 and vacuum chamber 58.

The vacuum chamber 58 has a length which is shorter than the length of the pressure chamber 54. The length of vacuum chamber 58 is sized such that the outer race of bearing 36 is firmly clamped between the vacuum chamber 58 and the base of the pressure chamber 54. The inside diameter of tubular portion 34 is greater than the outside diameter of bearing 36 allowing fluid to flow thereabout.

Tubular portion 34 has a pressure fitting 52, which is connected to pressure hose 24 and communicates with pressure chamber 54. Tubular portion 34 also has a vacuum fitting 56, which is connected to the vacuum hose 26. Vacuum chamber 58 has a radially extending bore 59, which is aligned with vacuum fitting 56 when insert 40 is mounted within outer housing 28. Vacuum chamber 58 surrounds the end region of the drill bit 20.

Tubular section 46 is aligned with the central longitudinal axis of the drill bit assembly 10. Tubular section 46, vacuum chamber 58, pressure chamber 54 and bore 30 present a passageway through which the drill bit 20 extends. Drill bit 20 extends through the drill bit assembly 10 in frictional engagement with the bushing 38. Bushing 38 will rotate with the drill bit 20 minimizing wear of the bushing 38. Bearing 36 will guide an end region of the drill bit 20 maintaining axial alignment and minimizing the play or "wobble" thereof.

Guide bracket 12 positions the housing 28 at a predetermined distance along the drill bit 20. The drill bit 20 extends beyond the end of tubular section 36 to be able to undertake a drilling operation. It is understood that the housing 28 should be positioned as close to the end of the drill bit as possible to minimize the amount of "wobble" yet be able to drill to the desired depth.

In use, a fluid such as air, or any other gas, inert or otherwise, is positively injected into pressure chamber 54, in which bearing 36 is housed and mounted. The fluid will flow about the bearing 36. Since vacuum chamber 58 is in fluid communication with pressure chamber 54, the fluid will then pass through opening 50 between vacuum chamber 42 and bushing 38 into vacuum chamber 58. Fluid is then exhausted through vacuum fitting 56 and out through vacuum hose 26. The exhaust will carry with it the debris, including shavings and dust, generated by the drilling operation.

The positive flow of fluid out through opening 50 creates an "air seal" at the mouth of pressure chamber 54 substantially preventing debris, including shavings and dust, from entering therein and ultimately from fouling bearing 36.

In test results, the drill bit assembly 10 of the present invention was tested against a standard nose block assembly available from The Budd Company, using a Fullerton cutter and a carbide tipped drill operating at 8,500 RPM and 2,900 RPM. The results of the test are summarized in Table 1.

TABLE 1

| SPEED (RPM) | PRIOR ART | | INVENTION | |
| --- | --- | --- | --- | --- |
| | Fullerton | Carbide Tipped Drill | Fullerton | Carbide Tipped Drill |
| HOLE OVERSIZE MEASUREMENT (inches) | | | | |
| 8500 | 0.03 | 0.005 | 0.005 | 0.0005 |
| 2900 | 0.005 | 0.001 | 0.005 | 0.0005 |
| NOISE LEVEL (db) | | | | |
| 8500 | 123 | 102 | 114 | 85 |
| 2900 | 106 | 94 | 98 | 83 |

The drill bit assembly of the present invention showed remarkable improvements in hole oversize measurements, and also operation noise level. In fact, the hole oversize measurement showed improvement over the prior art assembly in most cases by at least one order of magnitude. Further, the drill bit assembly of the present invention has a projected life of 100,000+ hours and yet is expected to maintain a hole diameter to a tolerance within 0.001 inches.

It is now apparent to a person skilled in the art that the drill bit assembly of the present invention could be readily modified. It is understood that certain modifications in the style, size and components may be effected without departure from the spirit of the invention and within the scope of the appended claims.

I claim:

1. A drill bit assembly for guiding a drill bit of a drill, said assembly comprising a housing having a central passageway including a pressure chamber in fluid communication with a vacuum chamber, said pressure chamber connectable with a pressure source and said vacuum chamber connectable with a vacuum source, a bearing assembly having an outer race mounted within the pressure chamber and an inner race for frictionally engaging said drill bit, and a bracket for mounting said housing such that said drill bit extends through said central passageway, whereby an air seal is formed between the pressure chamber and the vacuum chamber as fluid flows from said pressure chamber to said vacuum chamber substantially preventing ingress into the pressure chamber of debris generated by said drill bit.

2. The drill bit assembly as claimed in claim 1 wherein said vacuum chamber is an insert which fits within said pressure chamber for clamping said bearing within the pressure chamber.

3. The drill bit assembly as claimed in claim 2 wherein said inner race includes a bushing for engaging said drill bit.

4. The drill bit assembly as claimed in claim 3 wherein said housing has a pressure fitting in fluid communication with the pressure chamber and a vacuum fitting in fluid communication with the vacuum chamber.

5. The drill bit assembly as claimed in claim 1 wherein said bracket mounts said housing onto said drill.

6. The drill bit assembly as claimed in claim 1 wherein said bracket comprises a guide bracket releasably receiving said housing, a base bracket releasably mounted on said drill and a guide rod mounted on said base bracket to extend substantially parallel to said drill bit and said guide bracket releasably securable along said guide rod for positioning said housing a predetermined distance along the drill bit.

7. The drill bit assembly as claimed in claim 6 wherein said base bracket comprises two half units which complementarily clamp about an end of the drill.

8. A self-guiding drill bit assembly comprising a housing having a central passageway extending therethrough, said passageway comprising a pressure chamber in fluid communication with a vacuum chamber, said pressure chamber connectable with a pressure source and said vacuum chamber connectable with a vacuum source, said pressure source for effecting a fluid flow from said pressure chamber to said vacuum chamber substantially preventing debris within the vacuum chamber from entering the pressure chamber, and a bushing journal mounted within said pressure chamber, said journal mount comprising a ball bearing assembly having an inner race engaging said bushing, wherein said housing is mountable to position a drill bit to extend through said central passageway and to frictionally engage with said bushing maintaining axial alignment of said drill bit.

9. The self-guiding drill bit assembly as claimed in claim 8 wherein said vacuum chamber is an insert which fits within said pressure chamber clamping an outer race of said ball bearing assembly within the pressure chamber.

10. The self-guiding drill bit assembly as claimed in claim 9 wherein said drill bit assembly further comprises a bracket for mounting said housing.

11. The self-guiding drill bit assembly as claimed in claim 9 wherein said drill bit assembly further comprises a bracket for mounts said housing onto a drill.

12. The self-guiding drill bit assembly as claimed in claim 11 wherein said bracket comprises a guide bracket releasably engaging said housing, a base bracket releasably mounted on said drill and a guide rod mounted on said base bracket to extend substantially parallel to said drill bit and said guide bracket releasably securable along said guide rod for positioning said homing a predetermined distance along the drill bit.

13. The self-guiding drill bit assembly as claimed in claim 12 wherein said base bracket comprises two half units which complementarily clamp about an end of the drill.

14. The self-guiding drill bit assembly as claimed in claim 13 wherein said housing has a pressure fitting in fluid communication with the pressure chamber and a vacuum fitting in fluid communication with the vacuum chamber.

* * * * *